United States Patent [19]

Loucks et al.

[11] Patent Number: 5,434,974
[45] Date of Patent: Jul. 18, 1995

[54] NAME RESOLUTION FOR A MULTISYSTEM NETWORK

[75] Inventors: Larry K. Loucks; Amal A. Shaheen-Gouda, both of Austin, Tex.

[73] Assignee: International Business Machines Corporation, Armonk, N.Y.

[21] Appl. No.: 860,804

[22] Filed: Mar. 30, 1992

[51] Int. Cl.⁶ .............................................. G06F 13/14
[52] U.S. Cl. .................................... 395/200; 395/700; 364/242.94; 364/DIG. 1
[58] Field of Search ................ 395/400, 425, 200, 600, 395/700

[56] References Cited

U.S. PATENT DOCUMENTS 4,999,766  3/1991  Peter et al. ........................... 395/600

*Primary Examiner*—Thomas G. Black
*Assistant Examiner*—Larry J. Ellcessor
*Attorney, Agent, or Firm*—Keith Stephens; Diana L. Roberts

[57] ABSTRACT

A unique naming system and method are described for managing object identification by a network of computer systems. The naming system employs data structures stored in the memory of the computer systems containing character strings and corresponding addresses to entries in the data structures and objects in the computer systems. Names employed in a particular computer system that correspond to objects in another computer system are resolved by a border data structure capable of transforming names, delimiters and visas across computer systems.

18 Claims, 16 Drawing Sheets

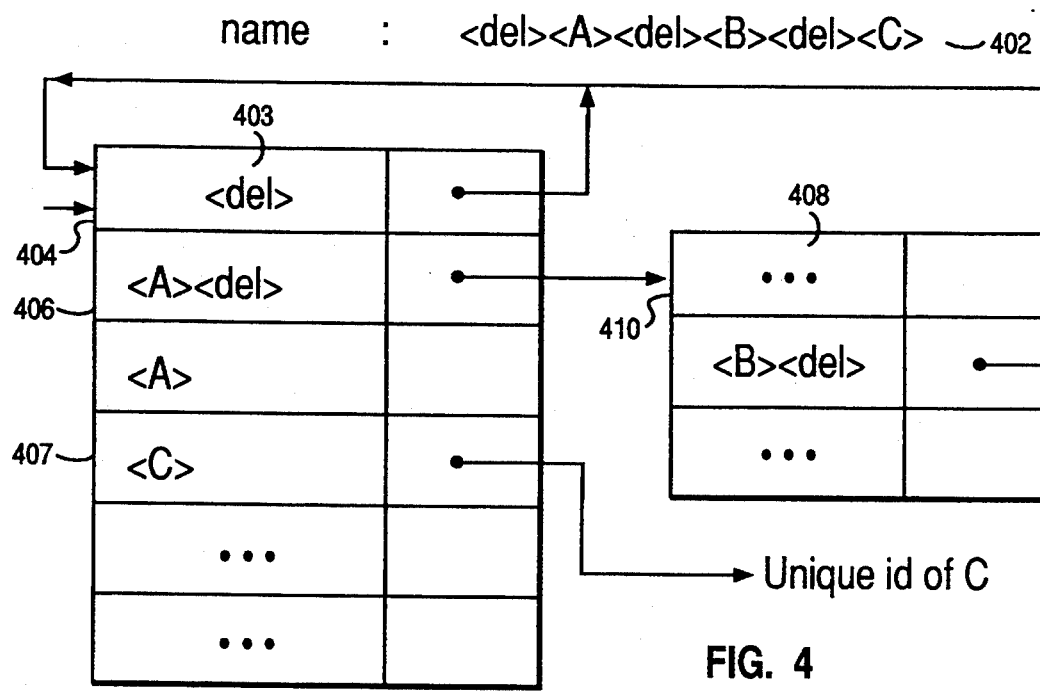
FIG. 4
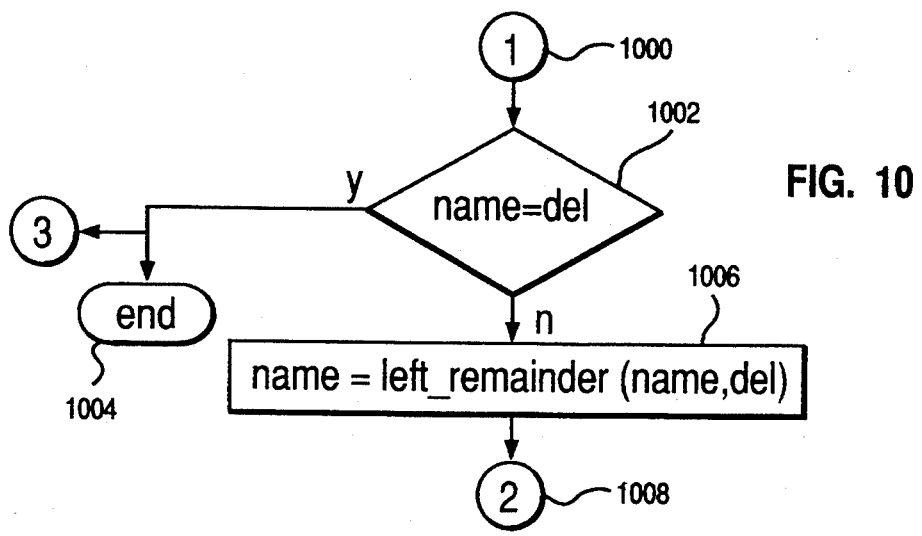
FIG. 10
FIG. 11

NAME RESOLUTION FOR A MULTISYSTEM NETWORK

FIELD OF THE INVENTION

This invention generally relates to improvements in computer systems for network environments and more particularly to uniquely defining resource names in a flexible manner.

BACKGROUND OF THE INVENTION

Name resolution is a fundamental function required to access operating systems and network objects such as hosts, printers, files, and mailboxes. Each object is usually known to its users by a name, and to the system supporting it by an object identifier called an address. A naming system resolves the names for objects it supports to addresses. The set of names constitute the naming space, and the set of addresses constitute the address space for that system.

Some examples of existing naming systems are the Unix file system discussed in D. Ritchie, K. Thompson, the UNIX time-sharing system, *Communication ACM*, 365-75 (1974); the domain name server discussed in P. Mockapetris, Development of the Domain Naming System, *ACM*, 123-33 (1988); profile naming system discussed in L. Peterson, The Profile Naming Service, *ACM Transactions on Computer Systems* 6, (4), 341-64, (1988); and the Global directory server discussed in B. Lampson, Designing a Global Name Service, *ACM*, 1-10 (1986).

Each of the systems listed above have a specific syntax for names and a resolution mechanism which resolves those names to addresses. Generally, names in a hierarchical name space consist of the multiple component_names separated by delimiters. Names in attribute-based name spaces contain <attribute_type=attribute_value> pairs as discussed in Comer, Douglas E. and Peterson, Larry L.; Understanding Naming in Distributed Systems, *Distributed Computing*, pp. 51-60 (1989). The resolution mechanisms in all of these systems are dependent on the specific name syntax, and while all resolution mechanisms resolve a name to an address, current naming systems must support additional functions and flexibility in name interpretation to support emerging naming standards such as X.500.

Other examples of prior art systems for identifying computer resources are disclosed in U.S. Pat. No. 4,914,571 entitled Locating Resources in Computer Networks; and U.S. Pat. No. 4,825,354 entitled Method of File Access in a Distributed Processing Computer Network. Examples of earlier name processing system work by the inventors includes EP 260458-A, entitled Operating System for Networking Processor—is arranged to recognise network architecture required for extended device file call; and EP 204994-A, entitled Generalized directory data model—Stores in data-base mapping of information related to names etc. with search and update controlled by algorithm.

U.S. Pat. No. 4,644,470 and U.S. Pat. No. 4,718,005 also discuss techniques for using alias names to facilitate communication over a common user network. However, none of the prior art techniques provide a flexible system and method for accommodating name resolution in accordance with the subject invention.

SUMMARY OF THE INVENTION

Accordingly, it is a primary object of the present invention to provide an improved system and method for constructing an resolving resource names in a naming system.

These and other objects of the present invention are accomplished by one or more computer systems under the cooperation and control of a naming system. The naming system employs data structures stored in the memory of the computer systems containing character strings and corresponding addresses to entries in the data structures and objects in the computer systems. Names employed in a particular computer system that correspond to objects in another computer system are resolved by a border data structure capable of transforming names, delimiters and visas across computer systems.

Different naming systems can reside on a single computer system. For example, a computer system can contain a file system with a specific naming syntax and a database system with a different naming syntax. The present invention constructs and resolves an object name containing syntax for both naming systems. This capability allows a database to exist as a special file in the file system and a database record to be accessed from a directory in the file system.

BRIEF DESCRIPTION OF THE DRAWINGS

FIG. 4 illustrates a data structure for resolving names in accordance with the subject invention;

FIG. 10 is additional detailed logic used in conjunction with the logic discussed relative to FIG. 9 in accordance with the subject invention;

FIG. 11 is a data structure representation of a lookup table as discussed in the detailed processing of FIG. 9 and in accordance with the subject invention;

FIG. 21 is a drawing of a border table data structure in accordance with the subject invention.

DETAILED DESCRIPTION OF THE INVENTION

Figure 1:
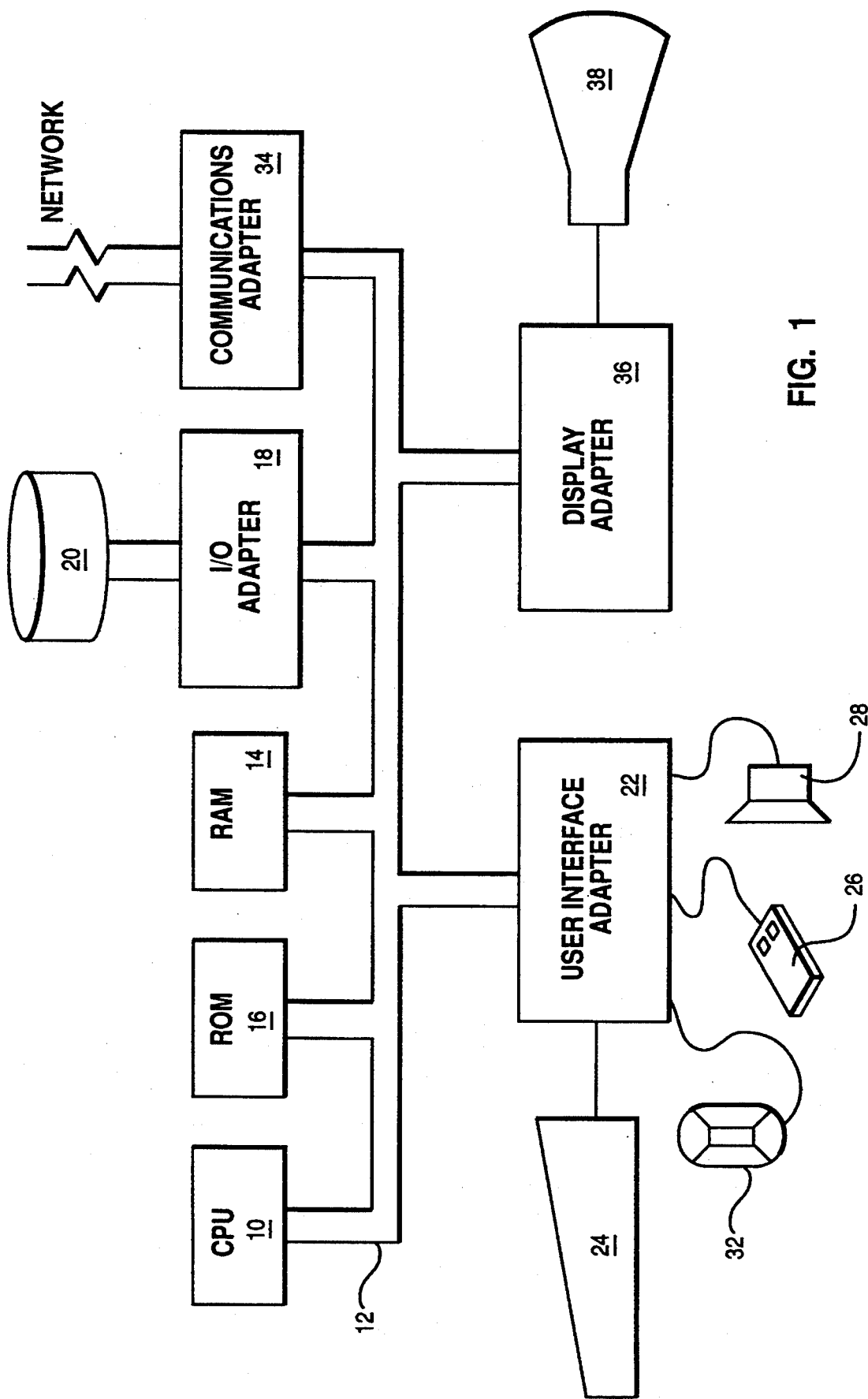
FIG. 1 is a block diagram of a personal computer system in accordance with the subject invention.

The invention is preferably practiced in a representative hardware environment as depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 and tape drives 40 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38.

Figure 2:
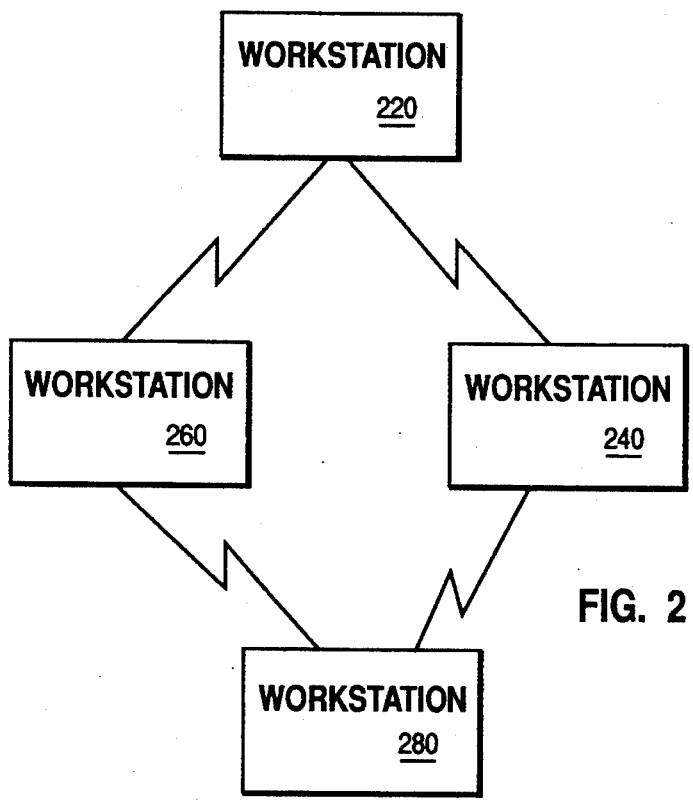
FIG. 2 depicts a network of FIG. 1 workstations connected together via a communication adapter 34 in accordance with the subject invention.

FIG. 2 depicts a network of FIG. 1 workstations connected together via the communication adapter 34. Each workstation has a naming system, and each of the workstation links is referred to as a name border. Name borders can be used in resolving names that span two or more name spaces, possibly in a distributed computing environment. A name border between two name spaces isolates the needed information to link the two name spaces while preserving the autonomy and independence of each name space. Formal definitions are presented for such concepts as names, addresses, name spaces, and resolution functions. A detailed implementation of a name border is given with an example of a name that spans multiple name spaces, and a disclosure discussing how to resolve the names using name borders.

Name resolution is a fundamental function required to access operating systems and network objects such as hosts, printers, files, and mailboxes. Each object is usually known to a user by a name, and to the system supporting it by an object identifier called an address. A naming system resolves the names for objects it supports to addresses. The set of names constitute the naming space, and a set of addresses constitute the address space for that system. Examples of existing naming systems are: a Unix file system, a Domain Name Server (DNS), profile naming system, a Universal Directory Service (UDS), and the global directory server. Each of these systems have a specific syntax for names, and a resolution mechanism which resolves those names into addresses. Generally, names in a hierarchical name space consist of the multiple component_names separated by delimiters. Names in attribute-based name spaces contain pairs. The resolution mechanisms are dependent on the specific name syntax, and while all resolution mechanisms resolve a name to an address, some are designed to support additional functions and flexibility in how they interpret names.

Two major problems arise when trying to access an object whose name contains component_names from multiple name spaces, each supported by a different naming system, possibly with a different naming syntax, such as a file on a remote host. The first problem is how to construct such a name, with potentially conflicting syntax between its components. The second is how to resolve it.

Consider a remote file example. File names in a Unix file system are defined by a pathname </dir1/dir2-/file>, and host names in DNS have the syntax <host-.domain1.domain2.topdomain>. A remote file's name should contain component_names with the above two syntaxes. The second problem, name resolution, is compounded by the fact that most naming systems are integrated in servers which provide other services. A file system provides security checks for user permissions to access files and resolves a file's name to an identifier. The domain naming system maps a host name to an address along with the system routing function for delivering messages to that host.

Numerous distributed applications and naming systems exist, each with a special approach to handle the above problems. For example, the DNS naming system reserves a plurality of characters to isolate name components that can be resolved by DNS from those that can't. The reserved character ":" separates a domain name of a host from an object's name on a specific host. The name <local_part: domain_name> states that the "domain_name" is to be resolve by DNS to a host address, while "local_part" is to be resolved by that host. Also, mailboxes are identified as user∂domain, or in general, local_part∂domain. This approach, however, requires that the isolation character is reserved in both name spaces. Another approach is to map a name format from a name space to another by a gateway between the two names spaces.

The invention discloses a new system and method for constructing and resolving names across multiple name spaces called Cascaded Names.

Objects, Systems, and Addresses

A system is defined as a finite set of objects. The objects in a system have distinct identifiers called addresses. An object can exist in more than one system, but it has an address for each system in which it exists. Addresses must be unique within a system, and addresses of the same object in different systems may or may not be different, but addresses of different objects in the same system are different. For example, a particular display adapter 36 in the workstation shown in FIG. 1 has a unique address in FIG. 2 for system 220, system 240, system 260 and system 280.

A system can also be an object in a larger system, in which case the system has an address in that larger system. For example a host system may have many individual workstations attached to the host system with each workstation comprising an individual system. A system that is not an object in a larger system is called a root system. In FIG. 2, each of the workstations 220, 240, 260 and 280 are root systems. Root systems have distinct addresses and multiple root systems can exist. DNS and X.500 are examples of individual root systems.

An absolute address of an object is defined recursively as follows. If an object is in a root system, then its address is an absolute address. If the object is not in a root system, then its absolute address is defined by the absolute address of that system, concatenated with the objects address in the system. The term address denotes an address of an object within a system. The absolute address of an object will be explicitly specified when used.

Consider a phone system in the USA as a root system. This system consists of different area systems. Each area system in turn consists of district systems, and each district system consists of a larger number of phones. A diagram of the phone system appears in FIG. 3. The phone system has an address consisting of the single digit "1" called the USA phone system code. Because area systems are objects in the same phone system, they have distinct addresses, called area codes. Each are code 300 and 304 is a string of three digits. District systems that belong to the same area system have distinct addresses, called district codes 312 and 320. Each district code is a string of three digits. Similarly, phones that belong to the same district system have distinct addresses, called phone codes 340, 342, 344, 346, 348 and 350. Each phone code is a string of four digits. The absolute address of a phone, called the phone number, is a concatenation of the following addresses:

the USA phone system code (1);
the area code of the area system where the phone resides;
the district code of the district system where the phone resides; and
the phone code.

Figure 3C:
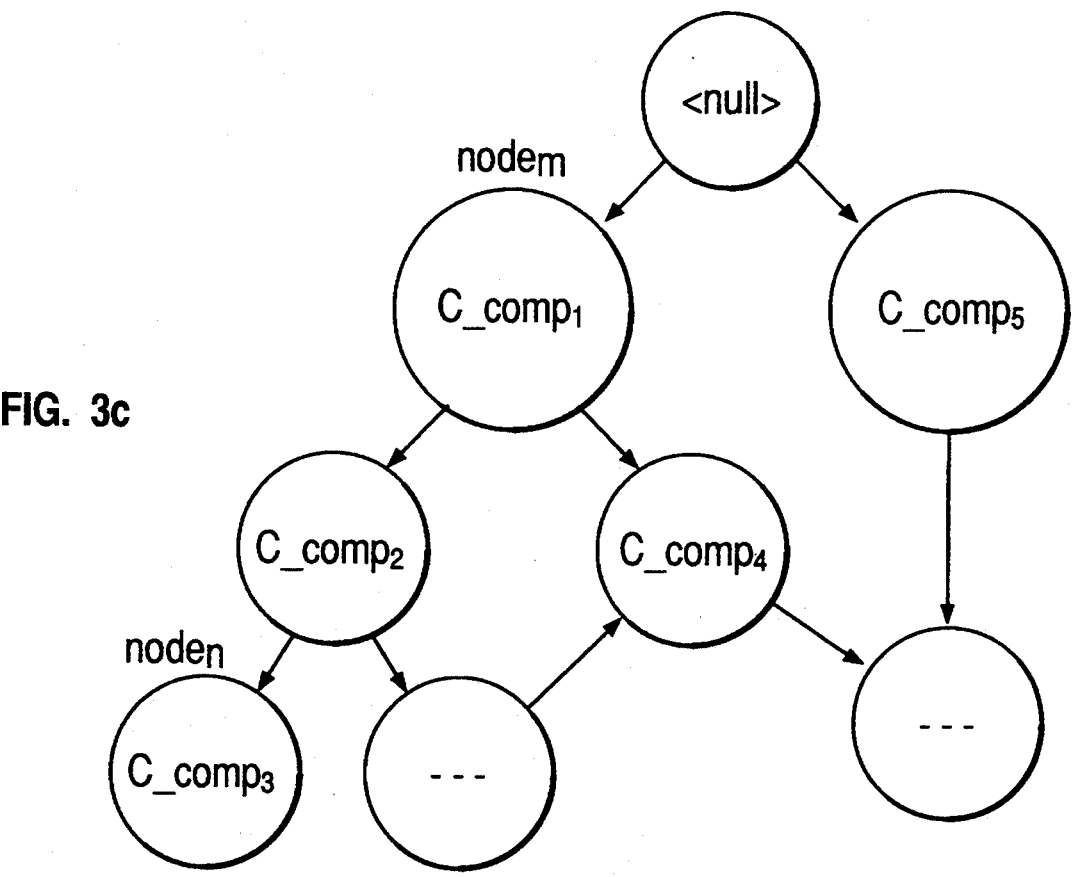
FIG. 3c is a representation of a name space N in accordance with the subject invention.
Figure 3A:
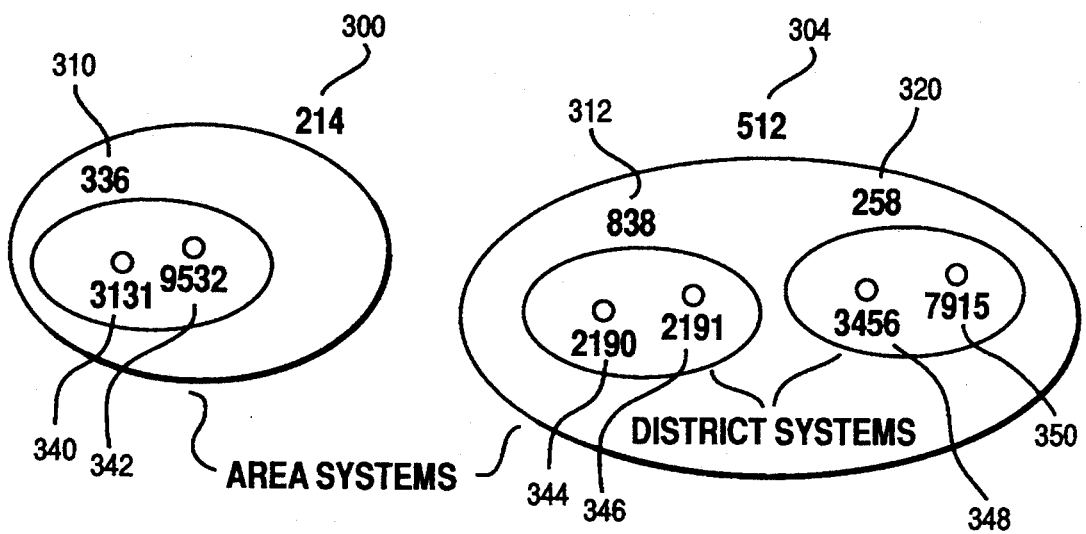
FIG. 3a is a diagram of a phone system depicting an address space similar to computer system addresses managed in accordance with the subject invention.
Figure 3B:
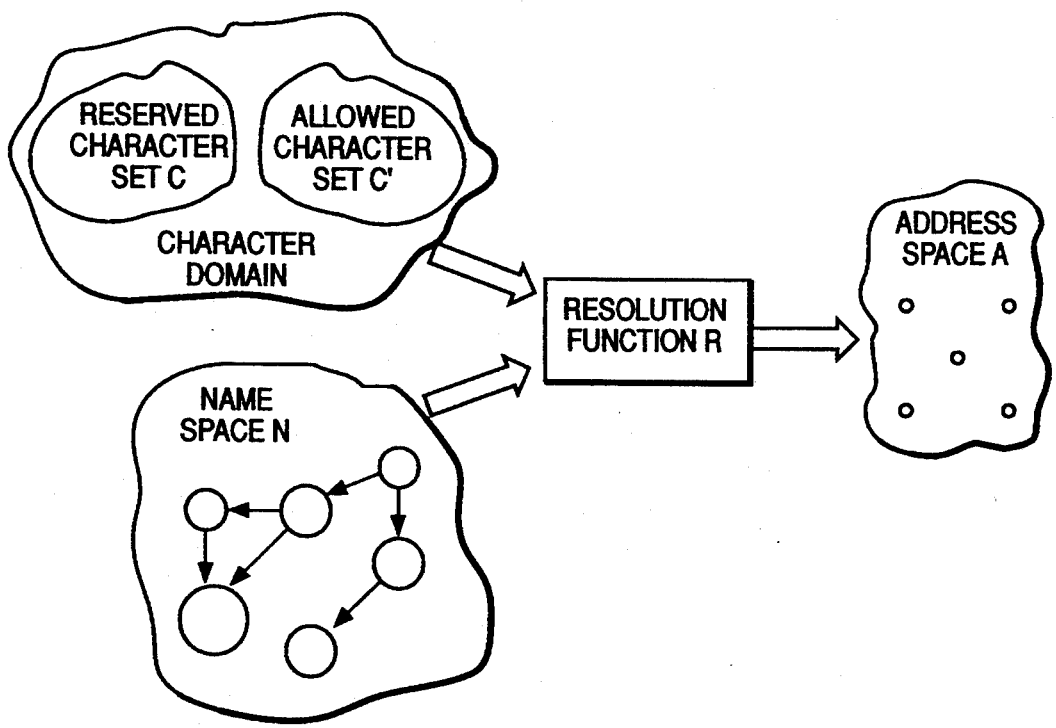
FIG. 3b is a representation of a naming system consisting of four components in accordance with the subject invention.

FIG. 3b is a representation of a name space N. The name space is represented by a directed graph. Each node in a graph is connected to one or more nodes by a directed edge, and is defined by a component_name called c_name. One node in the graph is denoted as "root" and has a <null> c_name.

FIG. 3c represents a naming system consisting of four components. The four components are: a name space, which is a set of names of the objects supported by a system, a character domain that defines the set of characters allowed in a user defined name, and those reserved by the system. The resolution function resolves a name defined over the character domain to an address of an object in the address space.

Naming Systems

In this section, we introduce a formal definition of naming systems. Components of a naming system are defined, and the function of each of them in the system is discussed. Naming systems are used to identify a set of objects via a pre specified interface. A naming system consists of four components:

1) an address space;
2) a character domain C;
3) a name space N; and
4) a resolution function R.

The components of the naming systems are illustrated in FIG. 3b and defined as follows. An address space A is a set of addresses for objects defined in the naming system. Each naming system defines two mutually exclusive sets of characters: a reserved set of characters, called the character domain, C, which is used by the system for constructing and resolving names, and an available set C' which can be used in user defined components of the object names. A name space, N, is defined as a directed graph as illustrated in FIG. 3c. Each node is labelled by a finite string of characters called a component name, c_name, which identifies the node. One node in the graph, the root, has the empty string as a component name. For other nodes, component names are finite, non-empty string of characters over the allowed character set C'.

Construction of a Name

A name from a name space is a finite set of characters. An absolute name of a node n in a name space N is defined as:

a_name$_{(n)}$ = <del><c_name$_1$><del><c_name$_2$>... <del><c_name$_n$> where:
c_name$_i$s are the labels of all nodes in the path from the root node to node n in N.

A relative Name of a node n from another node m is defined as:

r_name(m,n) = c_name$_{(m+1)}$<del><c_name$_2$>... .<del><c_name$_n$> where:
m and n are nodes in a name space N, and <n_name$_{(m+i)}$> are the labels of all nodes in the path from node m to node n in N.

Note that an absolute name in the name space corresponds to one node in the graph. Also, two names are equivalent iff they correspond to the same node. We refer to a name of either type simply as name, except when there is a need to address issues specific to one of them.

A homogeneous name is a name constructed from component names (c_names) separated by delimiters, such that c_names are elements in one name space N, and the delimiter <del> is an element of a reserved character set for a naming system S. Homogeneous names are resolved to addresses by the resolution function R of S.

Resolution Function

For a naming system, the resolution function R takes two arguments: an absolute name and a relative name (which can be the empty string), and it returns an address. R is defined as follows:

```
R (a_name(m), r_name(m, n))
  = address(n) if a_name(m) and r_name(m, n)
    are names in N
  = undefined otherwise. Where address(n) is
    the address of node n in address space A.
```

R resolves a name to an address in the same naming system. R depends on the character domain of the naming system. Specifically, it recognizes a special character, the delimiter <del>C which indicates the end of a c_name.

Examples of common naming systems are file systems and host names in a network such as the domain name server. In DNS, R takes a path in the format <host.domain.top_domain> and returns an a host address. In UNIX-like file systems, R takes an absolute name such as /usr/lpp and a relative name dir/file and returns a file handle (address) for the file /dir1/dir2/file. In DOS and OS/2 file systems, an absolute name of a file takes the format <drive: dir file>. In this case, the character domain has two separators, ":" which indicates the end of a drive name, and " ", that separates other c_names.

Cascaded Names

The previous discussion has been limited to constructing and resolving homogeneous names that have c_names in the same naming system. Often, however, one needs to access an object which cannot be identified by a homogeneous name such as a file or a user's mailbox on a remote host, possibly on a different network. In this case, the host name and file name are in different naming systems.

Assume that a name contains c_names from different naming systems $S_1$ and $S_2$, with delimiters <$del_1$> and <$del_2$>, and resolution functions $R_1$ and $R_2$ respectively. When resolving such a name, three problems arise:

1) how to detect the end of a c_name;
2) which character domain should be used; and
3) which resolution function: $R_1$ or $R_2$ is used to resolve the name?

Note that <$del_2$> may not be an element in $C_1$. Thus, <$del_2$> may appear in a valid node name, c_name, in $S_1$.

Numerous distributed applications exist, each with a special approach to handle the above problems. For example, the ARPANET internet domain name servers recognize two special characters: the "." and "∂". Servers accept names with the following format:

name=local_component∂host.domain where the character string on the right side of the ∂ indicates a host name in the domain naming system, and the string on its left is a local component of the name, to be resolved at that host. Other reserved character in S network applications use different characters to identify the boundaries between naming systems such as the ":" and the "%".

Problems will also arise in heterogeneous distributed file systems. Consider the case where a user of a UNIX-like operating system requires access to an OS/2 (or DOS) directory. The conventional Unix approach is to create a stub directory, and mount the OS/2 directory (or the drive containing it) on the stub. Let:

a_name(stub)=/u/user_id/stub be the absolute name for the stub directory at the client, and C: dir1 dir2 be the path of the OS/2 directory to be accessed. Following the Unix convention, the path to dir2 is the character string:

a_name(stub)=/u/user_id/C: dir1 dir2 and expects it to be resolved to the required directory. Note that a ":" is a valid character for a UNIX file name, and the " " is ignored. Thus, the client will resolve the mounted component to C:$dir_1 dir_2$ which cannot be resolved to the required directory.

A systematic approach to construct cascaded names with n_names from more than one naming system is required. The resolution of such a name resolution function in an existing computer system is also discussed.

Construction of a Cascaded Name

A cascaded name is defined as a name which contains component names from more than one naming system. Let:

<$name_1$> be a name from name space S1, whose delimiter is <$del_1$>,

<$name_2$> be a name from name space S2, whose delimiter is <$del_2$>,

<visa> be a finite, non-empty string of characters that does not include <$del_1$>.

Then:

name=<$name_1$> <$del_1$> <visa> <$del_1$> <$name_2$> is a cascaded name.

<$del_1$> <$del_1$> is defined as a pass through $S_1$, and <visa> allows entry from $S_1$ to $S_2$, across the borders between the two naming systems.

The next section introduces the concept of name borders and presents two algorithms for employing borders in cascaded name resolution.

Name Borders and Cascaded Name Resolution

Name borders are used in resolving names that span two or more naming systems, possibly in a distributed environment. A name border between two naming systems isolates the needed information to link the two systems while preserving the autonomy and independence of each system.

Assume that a cascaded name is to be resolved. A name border between S1 and S2 is defined as the Border Resolution Function which uses the pass resolution in S1 and Visa, to define the naming system to be used in resolving the remainder part of the name.

When resolving a name that spans multiple name spaces, a mechanism is needed to identify the borders between the two name spaces, and when to cross from one name space to another. Application programs use different conventions to identify when to switch between multiple name spaces. Two algorithms for crossing the borders from naming system $S_i$ to $S_{(i+1)}$, using Border Resolution Function $B_i$ are discussed below.

Resolution of Cascaded Names—Algorithm I:

In this algorithm, it is assumed that Resolution function $R_i$ for naming system $S_i$ is extended to detect the sequence pass (<$del_i$> <$del_i$>), and interpret it as the end of component names that can be resolved using $R_i$. It is also assumed that $R_i$ returns the delimiter $del_i$, which is then used by the following border function to define the end of $visa_i$. Thus, for $name_i$=r_name ($m_i$, $n_i$)

that starts at node $m_i$ in naming system $S_i$

---

$R_i$(a_name($m_i$), r_name($m_i$,$n_i$)) = address(n)
if a_name ($m_i$) & r_name($m_i$,$n_i$) are names in N
$R_i$(a_name($m_i$), r_name($m_i$,$n_i$)<$del_i$> <$del_i$>)
= address(n'), $del_i$
if a_name ($m_i$) & r_name($m_i$,$n_i$) are names in N;

-continued

= undefined otherwise.

The cascaded name name= $<name_1><pass_1><visa_1><del_1><name_2>$ which starts at a node $m_1$ in naming system $S_1$, is to be resolved to an address in naming system $S_2$, name is resolved as follows:

R1 (a_name($m_1$), name)=
B1 (address($n_1'$), $<visa_1><del_1><name_2>$)=
R2 (a_name($m_2$), $<name_2>$)=
address($n_2$) in $S_2$ Note that address $n_1'$ may or may not be the same as address $n_1$. A naming system may have a level of indirection (alias) when resolving a pass, that is only visible in $S_1$.

In general, the border function $B_i$ between $S_i$ and $S_{i+1}$ will accept as arguments an address for an object in naming system $S_i$ and the remainder of the "name" after resolving $<name_1><pass_1>\ldots<name_i><pass_i>$. $B_i$ will consume $<visa_i><del_i>$ and defines the next naming system $S_{i+1}$ to resolve "name", and the starting node at $S_{i+1}$. $B_i$ then calls the resolution function $R_{i+1}$ to continue name resolution.

$B_i$(address($n_i$), $<visa_i>$, $<del_i>$ $<name_i>$
$<pass_{(i+1)}><visa_{(i+1)}><del_{(i+1)}>$
...
$<name_{(K-1)}><pass_{(K-1)}><visa_{(K-1)}>$
$<del_{(K-1)}><name_K>$) =
$R_i + 1$(a_name$_{(m-i+1)}$,
$<name_i><pass_{(i+1)}><visa_{(i+1)}><del_{(i+1)}>$
...
$<name_{(K-1)}><pass_{(K-1)}><visa_{(K-1)}>$
$<del_{(K-1)}><name_{(K)}>$

Resolution of Cascaded Names—Algorithm II

A second algorithm is presented in this section to allow the use of name borders with existing naming systems without the resolution function modification required by the algorithm in section 5.1. In this algorithm, it is assumed that there is a two-level hierarchy of naming systems. Existing naming systems $S_1, S_2, \ldots, S_K$ are assumed to be objects in an attribute-based naming system S. For each object $S_i$ in S, the following attribute types are defined:

address A_$S_i$ in S; (Different object have different addresses.)
delimiter $<del_i>$;
a resolution function $R_i$, to be called when resolving a name in $S_i$; and
an optional alias name $N_i$, which can be resolved by S to $A_i$.

The cascaded name name = $<name_1><del_1><del_1><visa_1><del_1>$
$<name_2><del_2><del_2><visa_2><del_2>$
...
$<name_K>$ which starts at a node ($m_1$) in naming system $S_1$, is resolved as follows:

1. $R_1$ is called to resolve "$name_1$" to an address in $S_1$. $R_1$(a_name($m_1$), r_name($m_1,n_1$))=address ($n_1$).

2. A border function $B_1$ is called to identify $S_2$ and the starting point of $name_2$. $B1(A\_S_1$, address($n_1$), $visa_1$)=(A_$S_2$, a_name($m_2$))

Since S is an attribute-based naming system, address_$S_2$ readily identifies other attributes of $S_2$ such as the $R_2$ and $del_2$.

3. Steps (1) and (2) are repeated for i=2, K−1.
4. $R_K$ is called to resolve $name_K$ $R_K$ (a_name($m_K$), r_name($m_K,n_K$))=address($n_K$)
5. R (a_name($n_1$), name)=address($n_1$) for K=1=(address($n_K$), address($S_K$)) K>1

This architecture satisfies a requirement to isolate all the information needed for linking naming systems, while it avoids placing requirements on existing name resolution functions.

DETAILED LOGIC

FIG. 4 illustrates a data structure for resolving names in accordance with the subject invention residing in a memory or on a disk of a computer as depicted in FIG. 1. The data structure can be implemented as part of a relational database resident in memory or on the disk. The data structure is used to resolve the name appearing at label 402. In the Figure, $<del>$ is used to refer to a defined delimiter. Thus, the name is resolved by searching for the initial delimiter in the data structure at 403. The data structure is actually a two dimensional array containing character information in one array and integer, address information in the other array. Thus, when the delimiter is located in the character array at 404, the address in the linked integer array is used as a pointer to the location where the search for "$<A><del>$" should be commenced 403. When "$<A><del>$" is located, the address in the linked array is used as a pointer to the location where the search for "$<B><del>$" should be commenced 408. When "$<B><del>$" is located, the address in the linked, integer array is used as a pointer to the location where the search for "$<C>$" should be commenced 403. When "$<C>$" is matched in the character array 407, the address in the linked, integer array is the absolute address of the object "C".

The logic used to process a data structure in accordance with the subject invention includes a set of primitive functions that are common to the naming system. The first function is the LeftMost_String(string$_1$, string$_2$). This function searches the character string, string$_1$ from left to right until it matches string$_2$ or detects the end of string$_1$ without a match. The function then returns the string of characters in string$_1$ left of string$_2$. A common usage of the function is to search for a name in a character buffer, where name consists of several component names separated by delimiters and returns the leftmost component name. In cascaded names, this function is also used to scan a cascaded name from the left to detect $<del><del>$. Thus, LeftMost_String(cascaded_name, $<del><del>$) returns the left most name in a cascaded name residing in a character buffer.

The second function is rightmost_charact(STRING) which returns the rightmost character in a character string labeled STRING. The third function is right__remainder (STRING, STRING$_1$) which removes the character string STRING$_1$ from the rightmost location in STRING and returns the remainder string in the character string labeled STRING. The fourth function is left_remainder (STRING, STRING$_1$) which removes the character string STRING$_1$ from the leftmost location in STRING and returns the remainder string in the character string labeled STRING. The final primitive function is left_most (STRING, n) which returns the n leftmost characters located in the character string STRING in the character string STRING.

Figure 5:
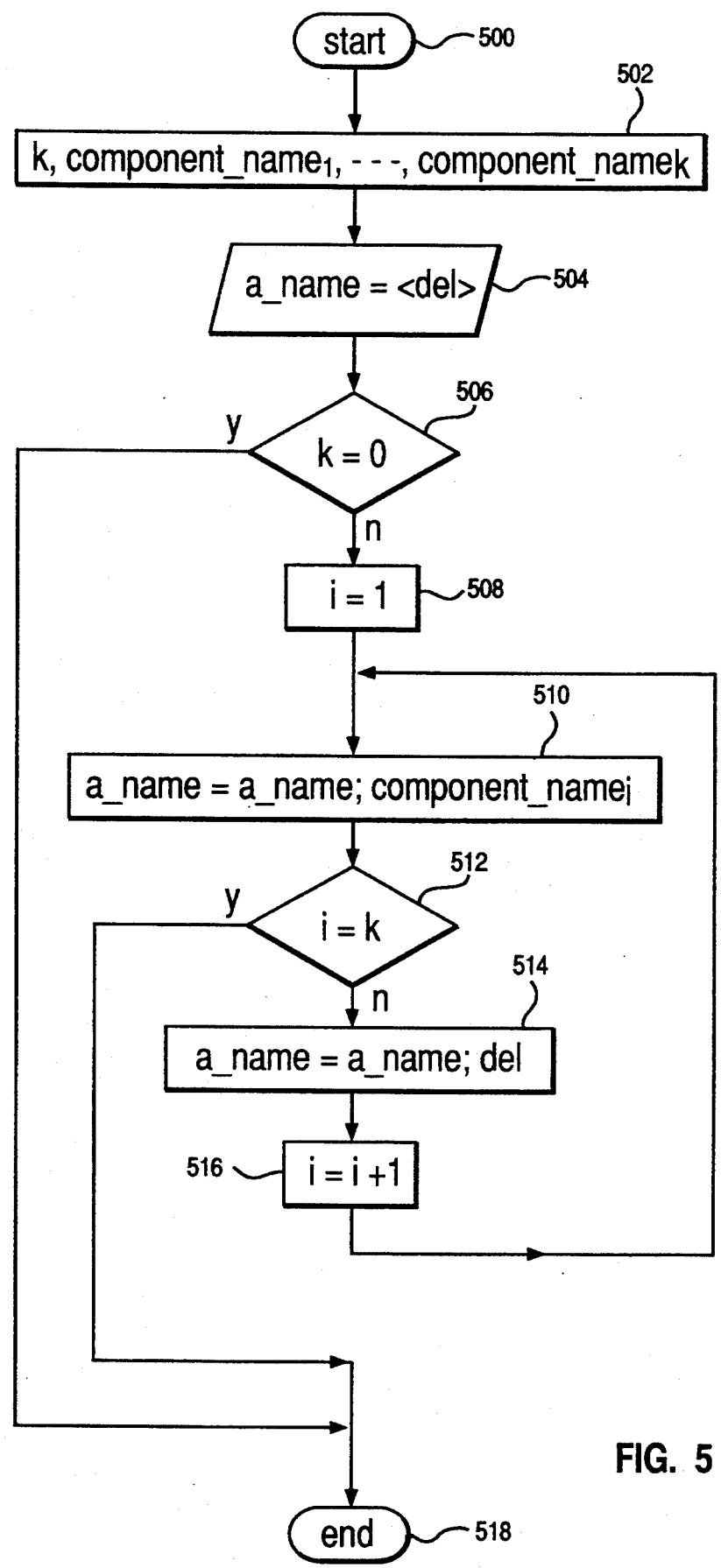
FIG. 5 is a flowchart of absolute name construction in accordance with the subject invention.

FIG. 5 is a flowchart of absolute name construction in accordance with the subject invention. This is an absolute name in one hierarchical name space, starting from the root of the name space. It is constructed by using the delimiter <del> and one on more component names. Processing commences at label 500 and immediately passes control to input block 502 for reception of the counter K, the delimiter character, and component_names 1, 2, ... K.

The information received over a communications adapter as shown in FIG. 1. In function block 504, a_name is equated to the delimiter character. Then a loop test is commenced at decision block 506 to determine if all component names have been processed. If so, then control passes to terminal 518 and processing is complete. However, if more component names remain to be processed, then a counter i is initialized in function block 508 to commence a loop.

Function block 510 builds the absolute name a_name by concatenating the existing a_name with the component_name$_i$. Then, at decision block 512, a test is performed to determine if the Kth component_name has been processed. If it has, then processing is complete and control passes to terminal 518. If not, then a delimiter is added onto the end of a_name as shown in function block 514. Then, the counter i is incremented and control passes to function block 510 for additional processing.

Figure 6:
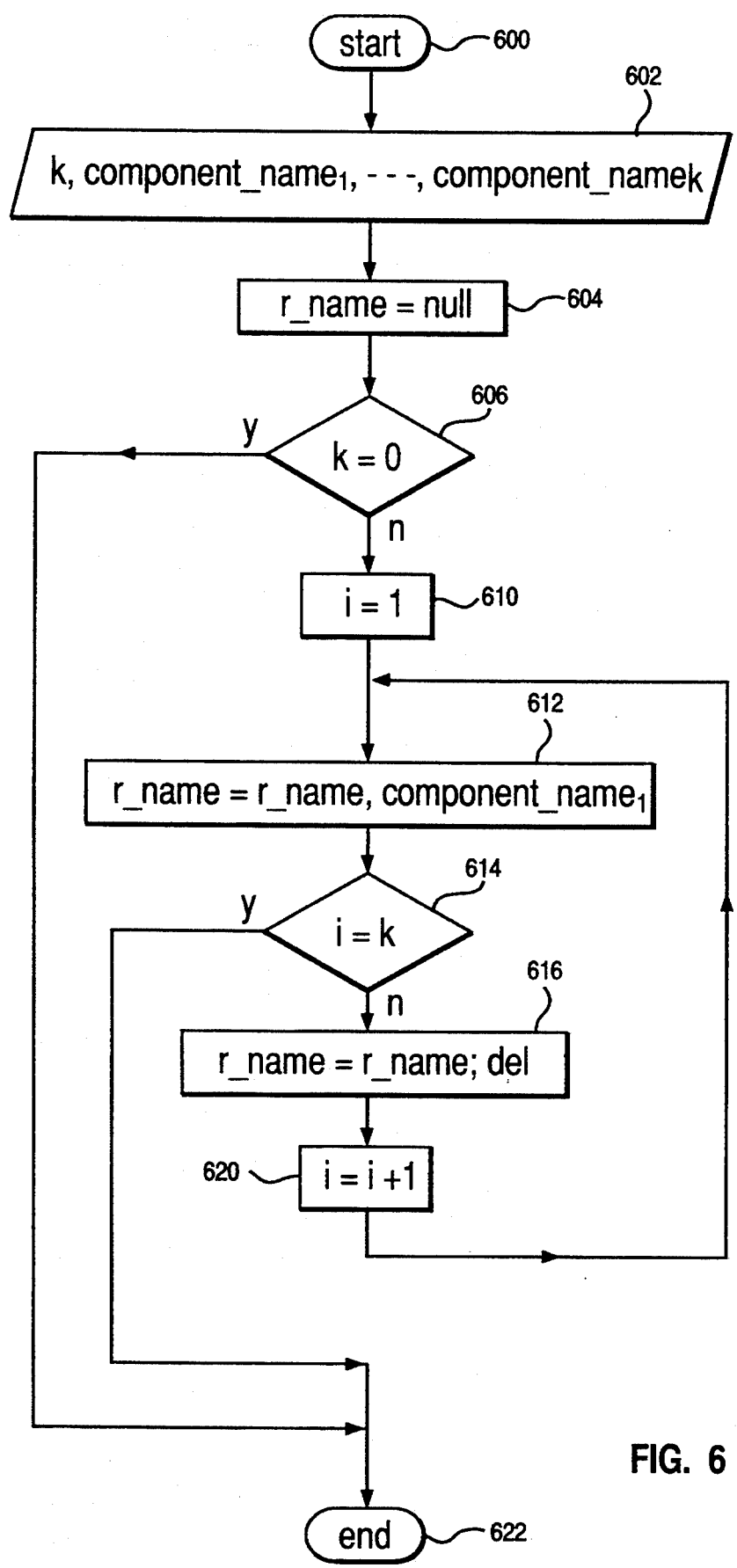
FIG. 6 is a flowchart depicting the detailed logic associated with construction of a relative name in a hierarchical name space in accordance with the subject invention.

FIG. 6 is a flowchart depicting the detailed logic associated with construction of a relative name in a hierarchical name space in accordance with the subject invention. Control commences at terminal 600 and immediately passes to input block 602 for reception of the counter K and component_names 1-K. The information may be received over a communication adapter as shown in FIG. 1. In function block 604, the relative name is initialized to the null character. Decision block 606 is processed next to determine if no component names are available for processing. If counter K is equal to zero, then control passes to terminal 622 and processing is complete. If K is not equal to zero, then a loop variable is initialized to 1 at function block 610 and a component_name$_i$ is concatenated onto the relative name in function block 612. Then, at decision block 614, the loop variable i is compared to K to determine if all of the component names have been processed. If i=K, then processing is complete and control passes to terminal 622. If not, then control passes to function block 616 where a delimiter is added onto the end of the relative name. Then, the loop index i is incremented and control flows to function block 612 for processing of the next component_name.

Figure 7:
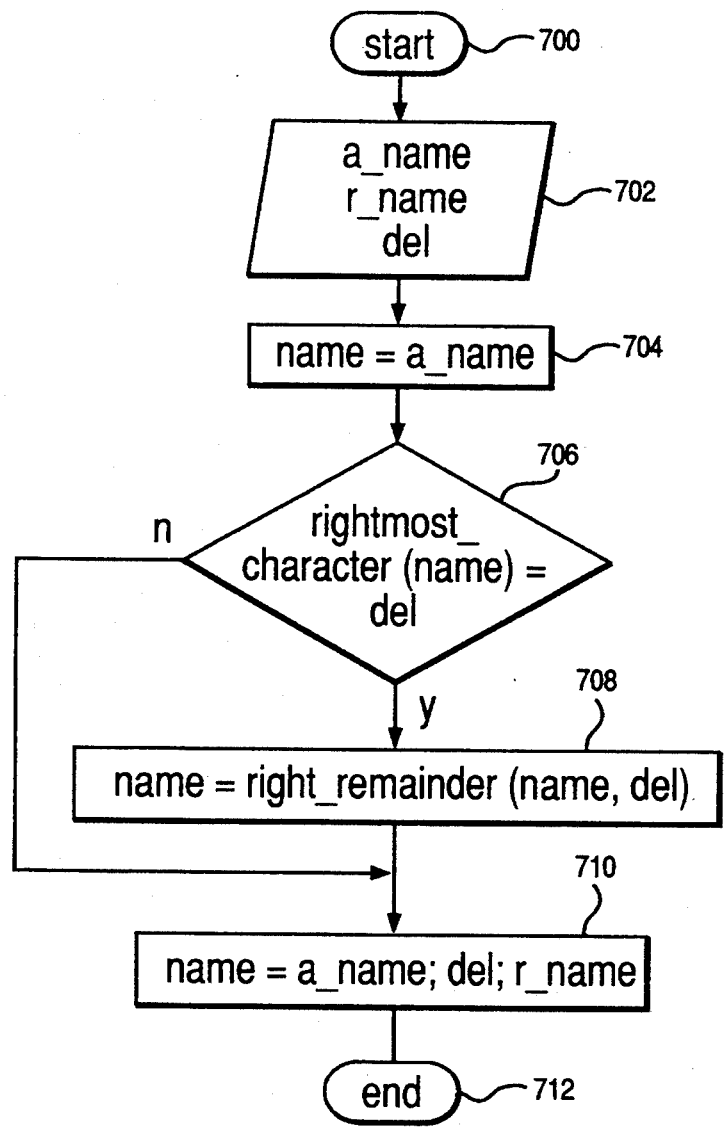
FIG. 7 is a flowchart of the detailed logic associated with construction of a name in a single name space in accordance with the subject invention.

FIG. 7 is a flowchart of the detailed logic associated with construction of a name in a single name space using the absolute name and relative name and the primitive functions rightmost_character and rightmost_remainder. Processing commences at terminal block 700 and control immediately flows to input block 702 for reception of absolute name, relative name and a delimiter character. Function block 704 initializes a name variable with the absolute name. Control then passes to decision block 706 to test the rightmost character of the absolute name to determine if it is the delimiter character. If a delimiter character is not detected, then control jumps to function block 710. If a delimiter character is detected, then the delimiter is stripped off in function block 708 and the final name is constructed in function block 710 by concatenating the absolute name, the delimiter character and the relative name. Finally, control passes to terminal 712 and processing is complete.

Figure 8:
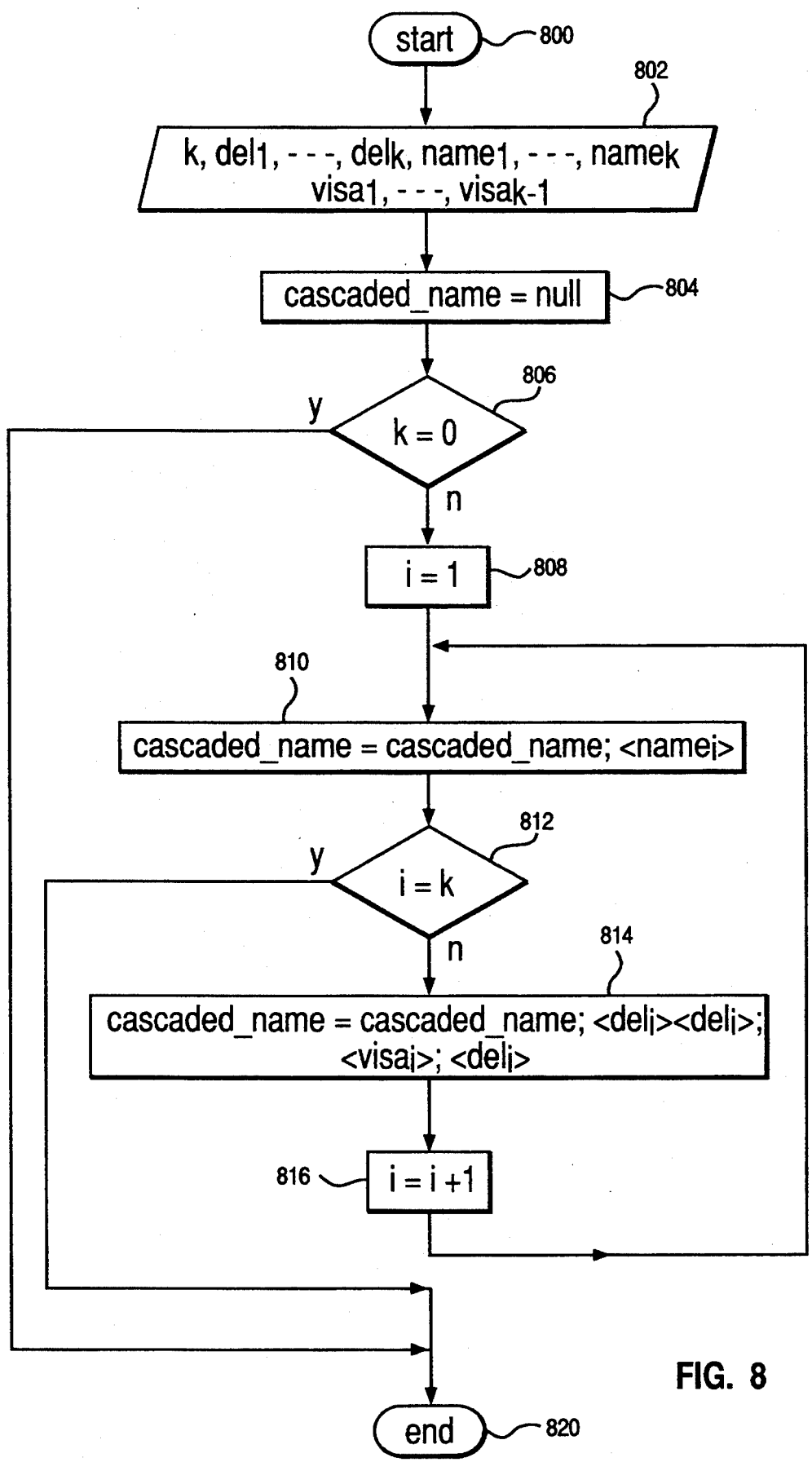
FIG. 8 is a flowchart of the detailed logic for construction of a cascaded name in accordance with the subject invention.

FIG. 8 is a flowchart of the detailed logic for construction of a cascaded name in accordance with the subject invention. Processing commences at terminal block 800 and immediately passes to input block 802 for reception of a counter K which identifies the maximum number of involved name spaces, delimiters for the name spaces, names to be resolved by the name spaces, and visas. Then, control passes to function block 804 for initialization of a cascaded_name to the null value. Next, at decision block 806, a test is performed to determine if the count is equal to zero. If so, then processing is complete and control passes to terminal block 820. If processing is not complete, then a loop counter i is set equal to 1 at function block 808 and a loop is commenced. Function block 810 concatenates the name$_i$ onto the cascaded_name. Then, a test is performed at decision block 812 to determine if i is equal to K. If so, then processing is complete and control passes to 820. If not, then two delimiter characters, visa$_i$, and a final delimiter are concatenated onto the cascaded name at function block 814. Then, at function block 816, the loop counter is incremented and control passes to function block 810 for additional name processing.

Figure 9:
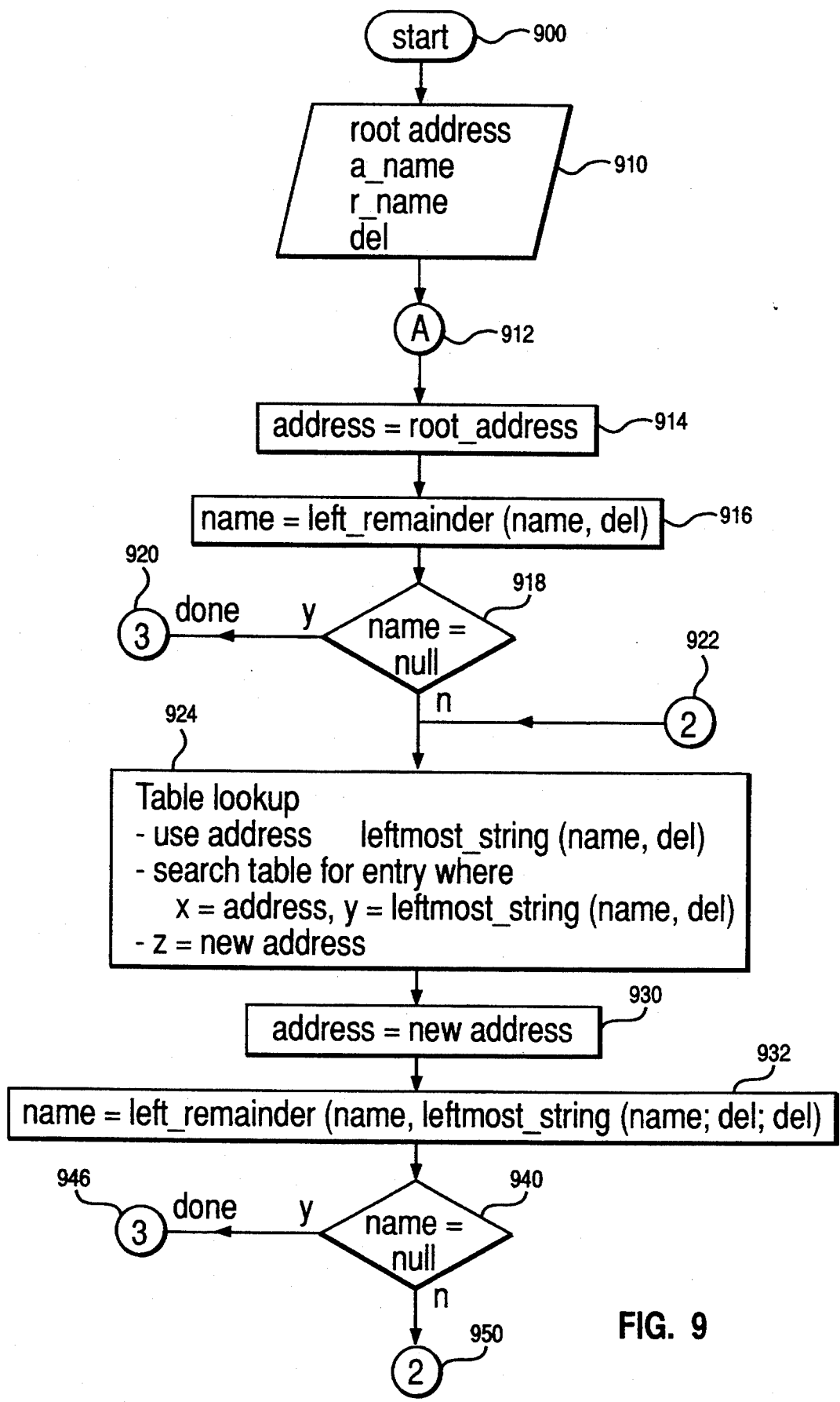
FIG. 9 is a flowchart depicting the detailed logic of a resolution function for one name space in accordance with the subject invention.

FIG. 9 is a flowchart depicting the detailed logic of a resolution function for one name space in accordance with the subject invention. Processing commences at 900 and immediately flows to input block 910 to receive a root address, absolute name, relative name and delimiter character. Then, control is passed at label 912 to label 600 of FIG. 6 for construction of a name from the given absolute name, relative name and the delimiter. Then, at function block 914 address is initialized to the root address and in function block 916, name is initialized to the left most characters of the name after the leftmost delimiter character is removed. A test is performed next at decision block 918 to determine if the name is now equal to the null character. If so, then processing is complete and control is passes to termination block 920. If not, then at function block 924, component_name is defined as the character string on the left of the first occurrence of the delimiter from the left in name. A table lookup is performed to ascertain the new address. The table lookup includes resolving the absolute name and the relative name r_names to recursively call LeftMost_String(name, del) to obtain component names and resolve the name to an address as explained in the detailed description of FIG. 4.

The table appears in FIG. 11 and is queried by lookup employing the current address and the component_name to search the table for a entry where the X entry 1100 is equal to address and the y entry 1102 is equal to component_name. The corresponding entry in the new_address entry 1104 is the new address used in function block 930 of FIG. 9 for replacement of the address value. Then, in function block 932, name is further processed to remove component name. Then, in decision block 940 a test is performed to determine if name is equal to the null value. If so, then processing is completed and control passes to termination block 920. If not, then processing is contained via label 950 corresponding to label 1000 in FIG. 10 which immediately performs a test at decision block 1002 to determine if name is equal to a delimiter character. If not, then the delimiter character is stripped off of the name in function block 1006 and a branch is performed via label 1008 to label 922 of FIG. 9 to function block 924. If name is equal to the delimiter character, then processing is complete and control flows to terminal 1004.

FIG. 10 is additional detailed logic used in conjunction with the logic discussed relative to FIG. 9 in accordance with the subject invention. FIG. 11 is a data structure representation of a lookup table as discussed in the detailed processing of FIG. 9 and in accordance with the subject invention.

Figure 12:
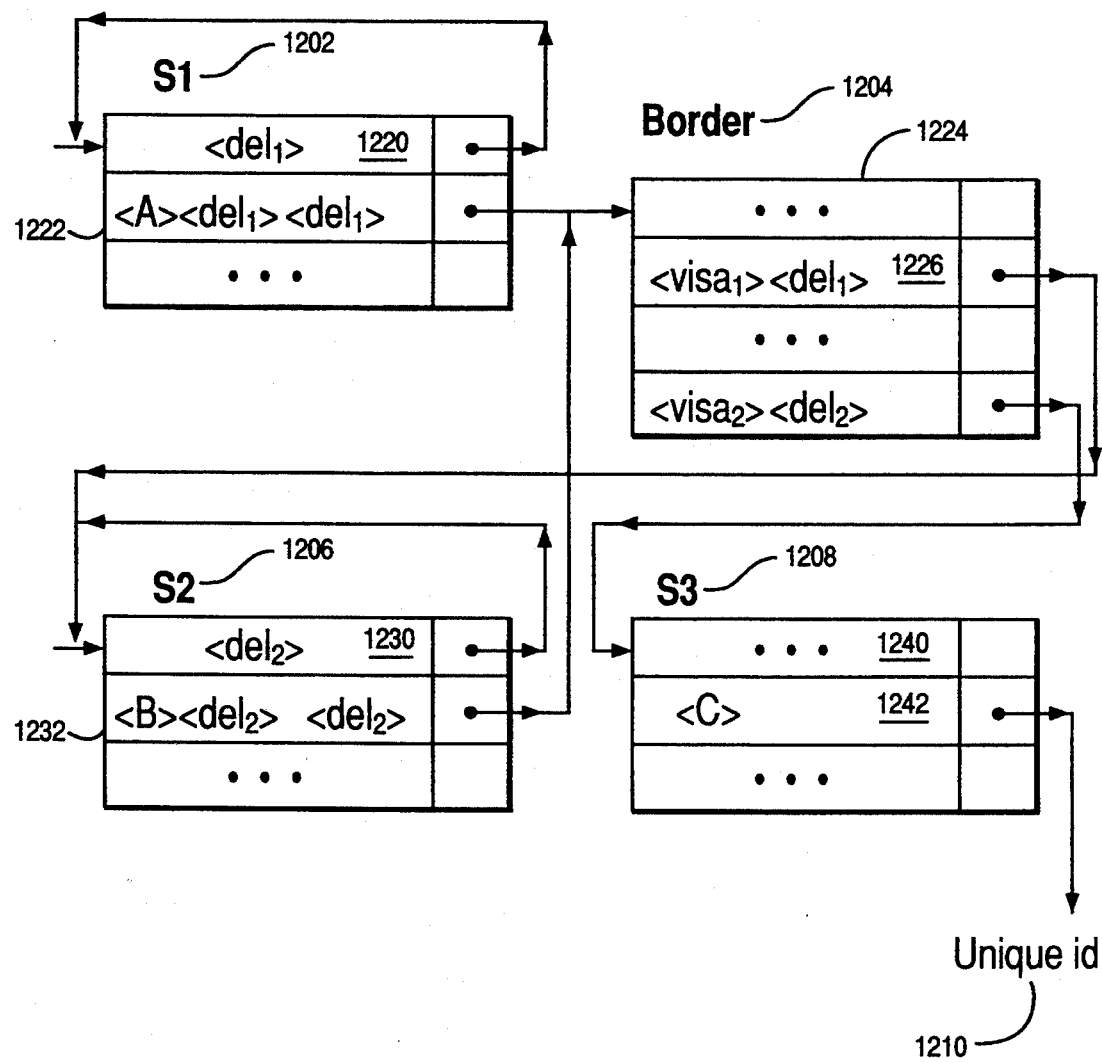
FIG. 12 illustrates a data structure for resolving cascaded names in accordance with the subject invention.

FIG. 12 illustrates a data structure for resolving cascaded names in accordance with the subject invention residing in a memory or on a disk of a computer as depicted in FIG. 1. The data structure is used to resolve the name appearing at label 1200. There are three distinct naming systems tied into this example, 1202, 1206 and 1208. Name cascading refers to the resolution of a name with visa and delimiters across system borders into the particular name unique to the particular system. Thus, as a name constructed in S1 1202 and referring to an object in system S3 1208 is resolved, it must have its visa resolved via the border linked list data structure at 1204. After resolving the leftmost i names in a cascaded name, this function defines the subsequent naming system which resolves the remainder of the cascaded name. The function takes as input parameters the address $A\_S_i$ of the preceding naming system $S_i$, the address $n_i$ of the last name in $S_i$, and $visa_i$. It returns the address $A\_S_{i+1}$ of the naming system $S_{i+1}$ and the absolute name $a\_name(m_{i+1})$ of the starting node in $S_{i+1}$. Since $S_{i+1}$ is an object in an attribute based name space, $A\_S_{i+1}$ readily identifies resolution function $R_{i+1}$ and the delimiter $<del_{i+1}>$ for $S_{i+1}$.

For example, the name appearing at 1200 is resolved by searching for $<del_1>$ in 1202. The address linked to $<del_1>$ points to the beginning of the list to query for $<A><del_1><del_1>$ at 1220. When a match is found at 1222, the address linked to that entry points to the particular border data structure where $<via_1><del_1>$ can be matched. The match occurs at entry 1226 and the linked address points to an entry for $<B><del_2><del_2>$ at location 1230. When a match occurs at 1232, the address associated with the matched entry points back to the border data structure wherein the search commences for $<visa_2>$. The entry matching $<visa_2><del_2>$ has a corresponding address which points to the beginning of the linked list 1240 wherein $<C>$ can be searched for. The entry matching $<C>$ 1242 has a corresponding entry with the unique id address 1210 corresponding to $<C>$ in name space $S_3$.

Figure 13:
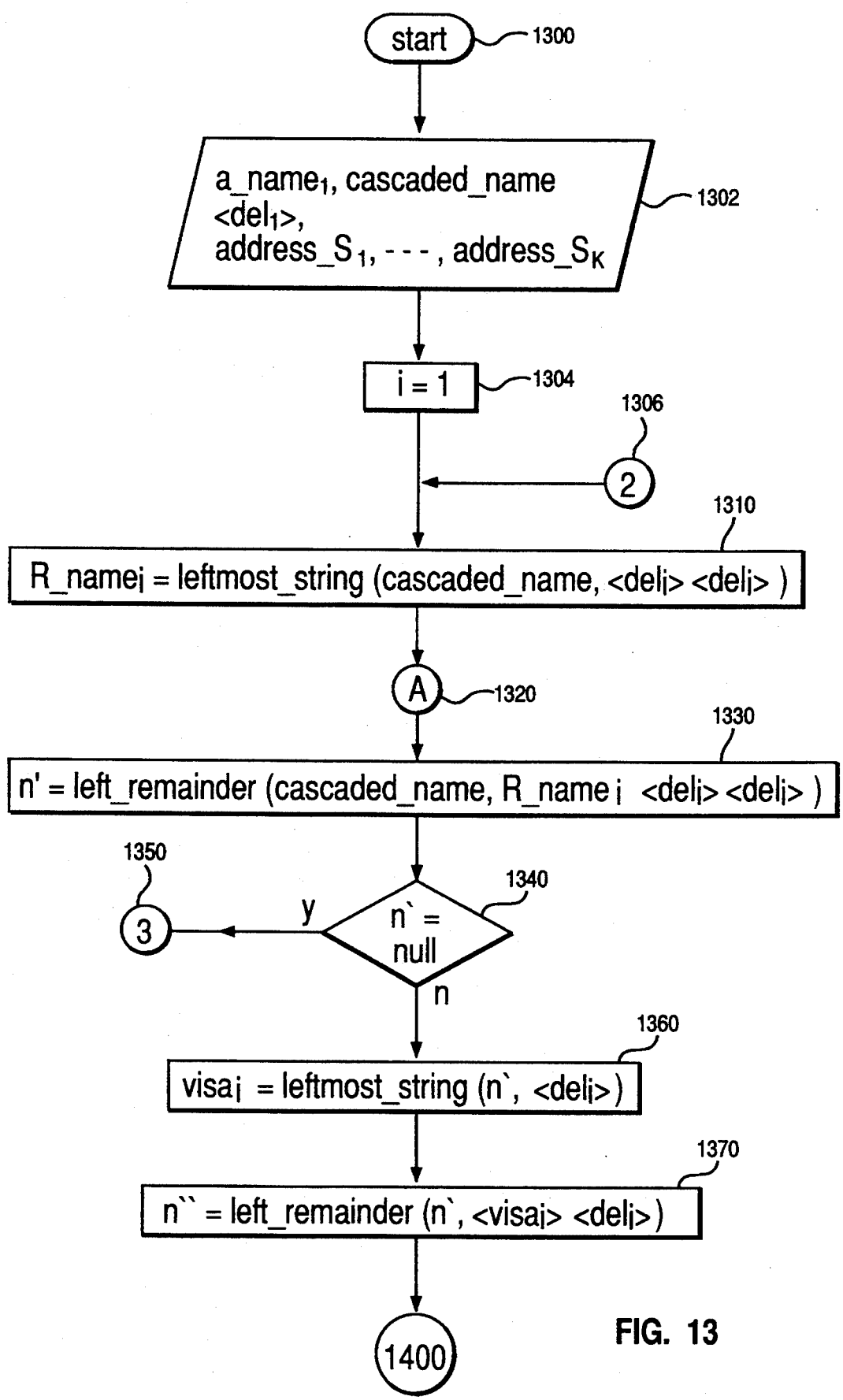
FIGS. 13, 14 and 15 are flowcharts setting forth the detailed logic corresponding to resolution of cascaded names in accordance with the subject invention.
Figure 14:
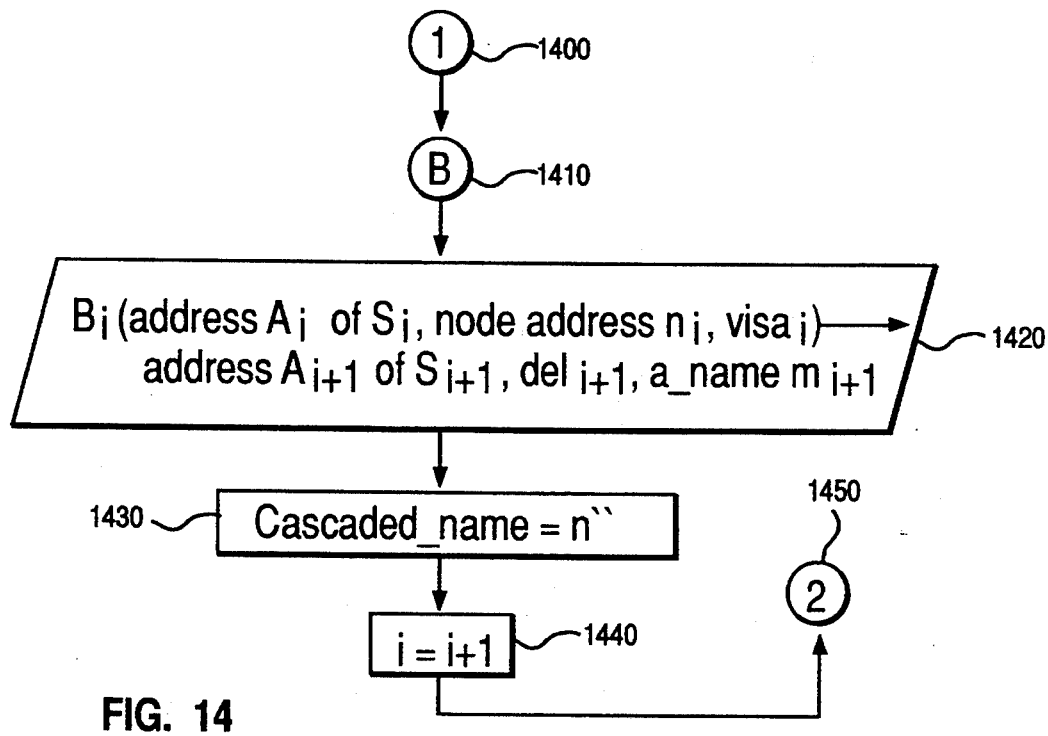

FIG. 13 is a flowchart setting forth the detailed logic corresponding to a resolution of cascaded names in accordance with the subject invention. Processing commences at 1300 and control is immediately passed to input block 1302 where an absolute name, cascaded name, delimiter for the first name space to be used in resolving the cascaded name, and addresses for each naming system involved are received. Then, at function block 1304, a counter i is initialized to 1 and in function block 1310 the cascaded name is processed to isolate the ith relative name ($r\_name_i$) which will be resolved by name space $S_i$. $R\_name_i$ is equated with the character string in cascaded_name, left to the first occurrence of the sequence $<del_i><del_i>$. Then, at label 1320 the relative name $r\_name_i$ is resolved as set forth in the detailed logic of FIG. 6. The relative name $r\_name_i$ and the sequence $<del_i><del_i>$ are then removed from cascaded name in function block 1330. A test is performed at decision block 1340 to determine if the cascaded_name is equal to the null value. If it is, then control is passed via label 1350 to FIG. 15 label 1500. If it is not equal to a null value, then $visa_i$ is set equal to the character string left of $<del_i>$ in cascaded_name at function block 1360. The cascaded_name is then defined as the remainder of that name after removing $<visa><del_i>$ at function block 1370 and control is passed to label 1400 of FIG. 14. Control is then transferred to function block 1600 in FIG. 16 to process the border function on $B_i$. Function block 1420 determines the next address based on the current address information. Then, index i is incremented at function block 1440 and control is passed via label 1450 to label 1306 of FIG. 13 to process the next name.

Figure 15:
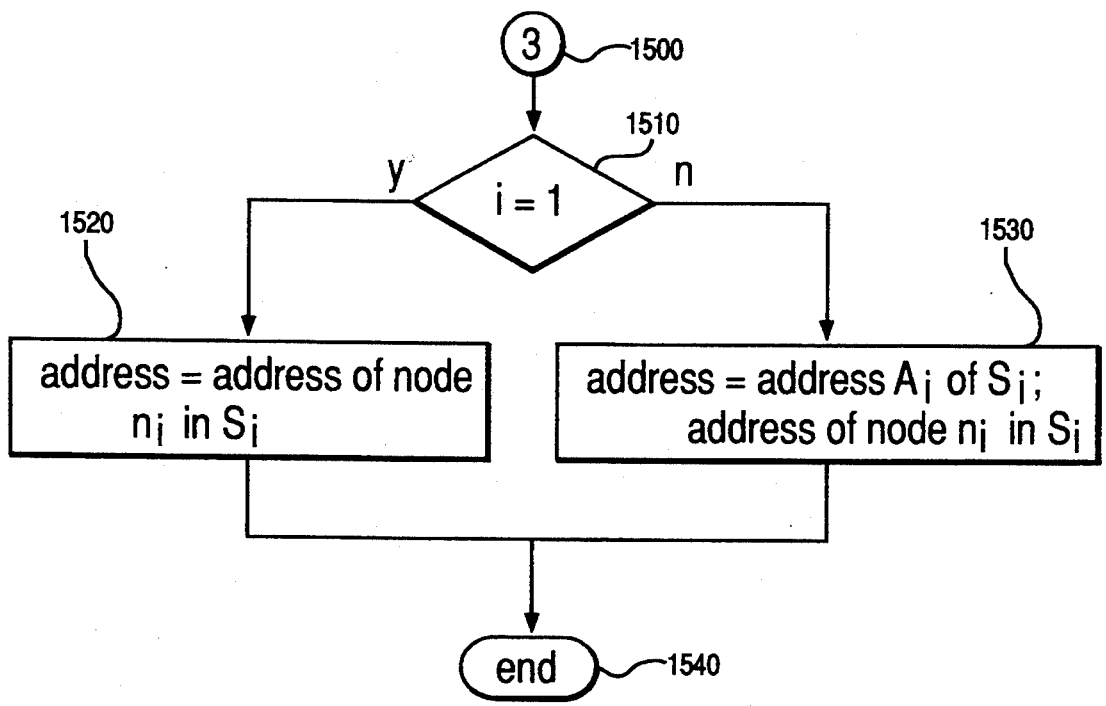

FIG. 15 is a detailed flowchart depicting the logic associated with processing addresses in accordance with the subject invention. Processing commences at label 1500 which flows into decision block 1510 to determine if i is equal to one; i.e. there was only one name space involved in resolving the name. If so, then in function block 1520, address is equated to the address of node $n_i$ in that system and processing is completed at terminal block 1540. If i is not equal to one, then address consists of the address of the last system and the address of the final node encountered during name resolution in that system as shown in function block 1530 and control is passes to terminal block 1540.

Figure 16:
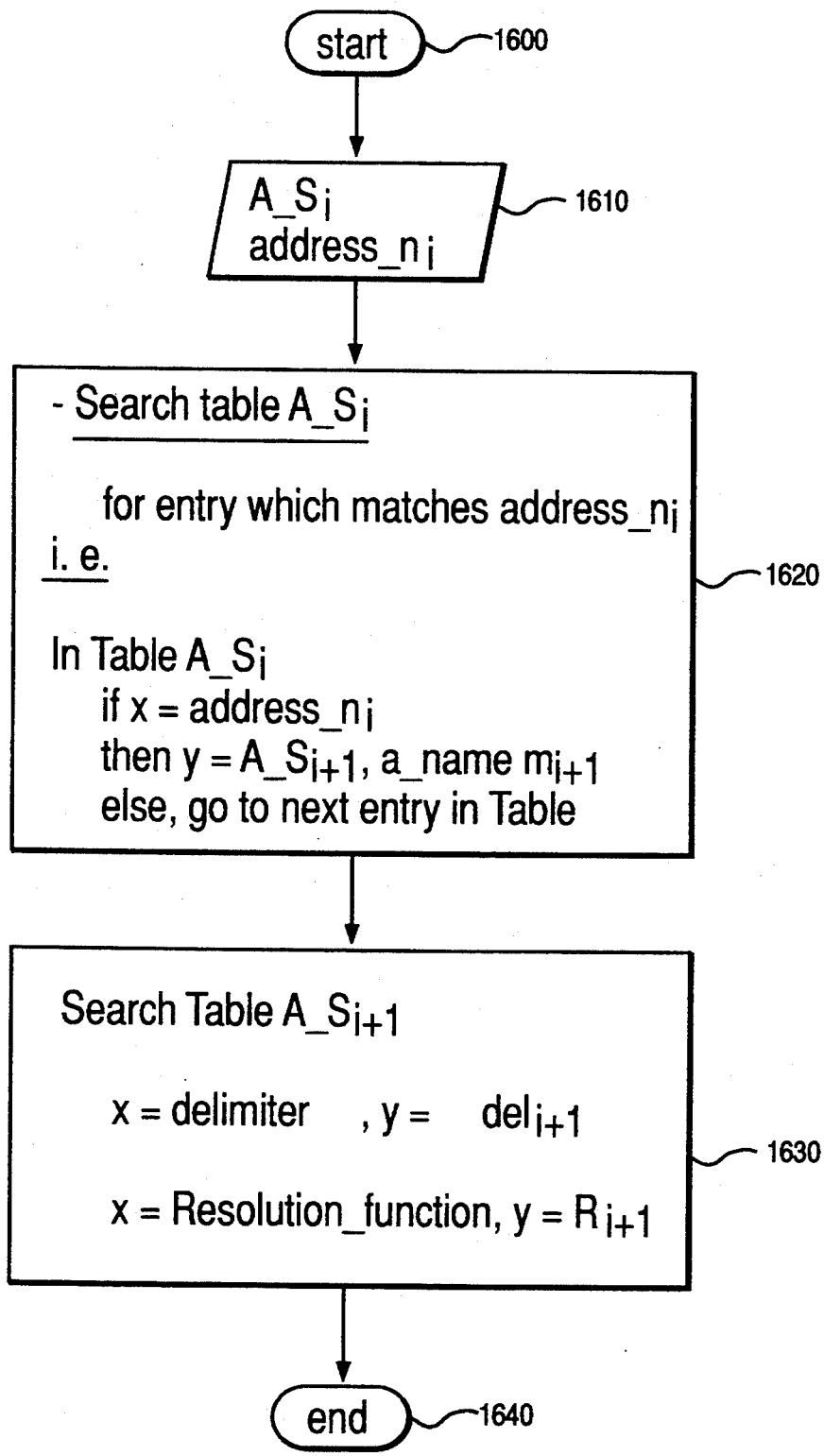
FIG. 16 is the detailed logic associated with the border function in accordance with the subject invention.

FIG. 16 is the detailed logic associated with the border function in accordance with the subject invention. Processing commences at 1600 and passes to input block 1610 for reception of the address of the data structure corresponding to the ith naming system $A\_S_i$ and the address of the node $n_i$ in that system. Then, at function block 1620, the data structure for $A\_S_i$ is searched for a match of the name at the address corresponding to the ith name. The data structure is a three dimensional array. For each entry, the X value is an address of a node and the Y value is a visa. The Z value is a pointer to the data structure $A\_S_{i+1}$ for the following naming system after the border, and the absolute name of the starting node in $A\_S_{i+1}$.

Referring to FIG. 21, which is a drawing of the border table data structure located at the address of the ith system ($A\_S_i$), the column of string values at 2100 are searched for a match of the matched to the ith node (address_$n_i$) and the corresponding value in the column labeled 2110 is the visa. The column labelled 2120 corresponds to the next entry to be used.

Retuning to FIG. 16, the next step in the border processing is to search the table corresponding to the address of the i+1 system at function block 1630. The first entries in the table define the attributes of that system. Each entry has an {attribute type=attribute value} pair. For attribute type delimiter, the value is $del_{i+1}$, and for type resolution, the value is $R_{i+1}$.

Figure 17:
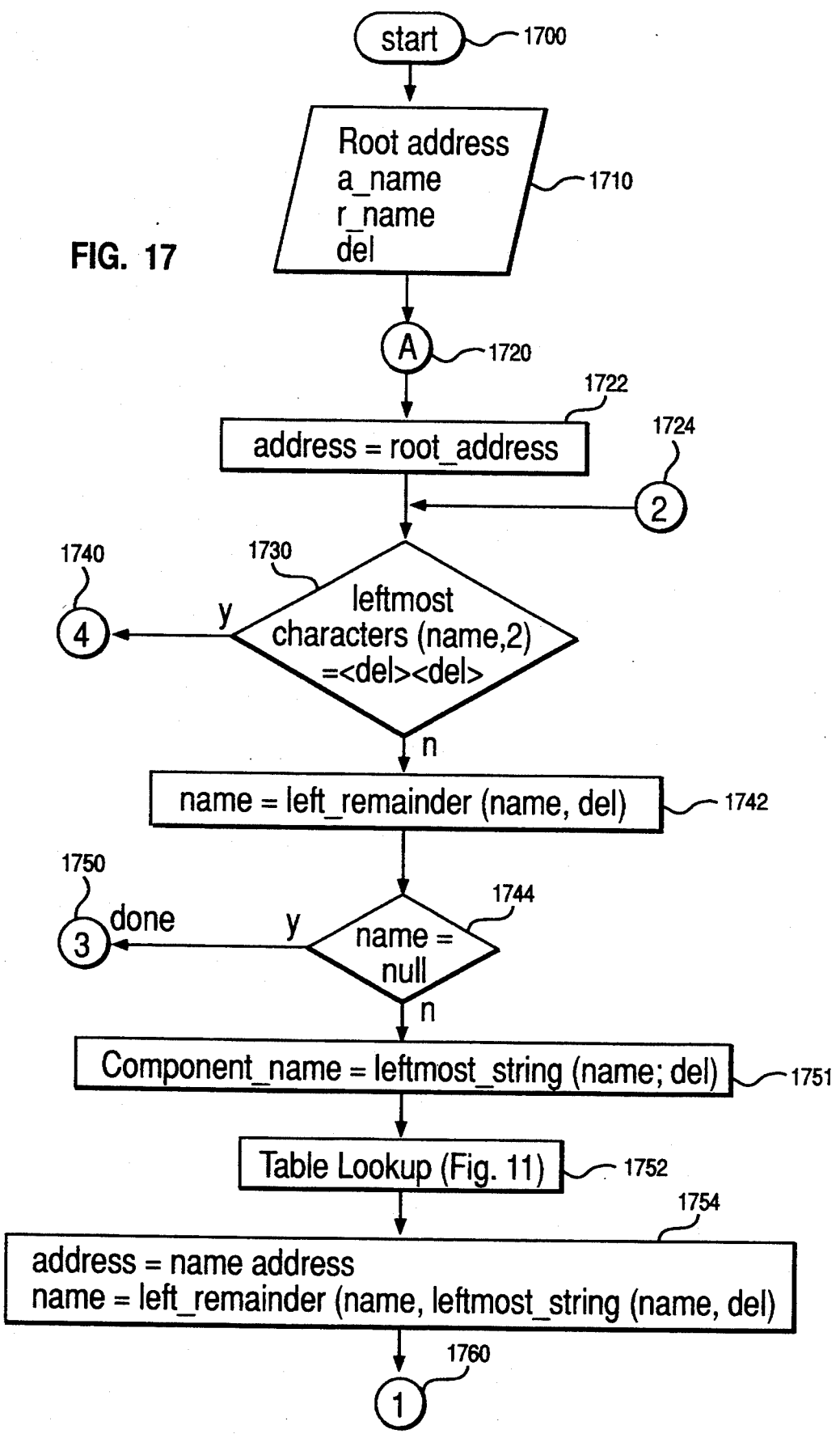
FIGS. 17 and 18 are flowcharts depicting the detailed logic of the extended name resolution for a single name space in accordance with the subject invention.
Figure 18:
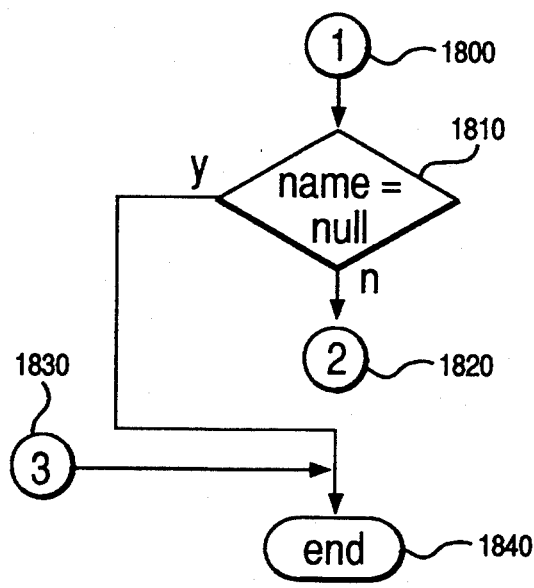

FIG. 17 is a flowchart depicting the detailed logic of the extended name resolution for a single name space. Processing commences at label 1700 and receives input of a root address, absolute name, relative name and delimiter at function block 1710. Then, the relative name, absolute name and delimiter are used to construct a name in accordance with the logic set forth in FIG. 6 at 1720 and an address is initialized to the root address at 1722. The basic extension to the resolution function is to search for and identify the sequence <del><del>. Then, at decision block 1730, the two leftmost characters in name are checked to see if they are <del><del>. If the test is affirmative, the control passes to label 1740. If the test is not, then in function block 1742, the delimiter character is stripped from name and a test is performed at decision block 1744 to determine if the name is equal to null. If so, then processing is complete and control is transferred to 1750. If not, then in function block 1751, the following component name in the path is defined as the string of characters left of the first delimiter, a table lookup is performed in accordance with the logic set forth in FIG. 11. The table lookup returns a new address in function block 1754, the new values for address is assigned and the name is redefined after removing the component_name for its left. Then, control passes to FIG. 18 via label 1760. FIG. 18 tests to determine if the name is equal to a null at 1810 and completes processing if it is at terminal 1840. If the name is not equal to a null, then processing is returned to FIG. 17 label 1724 for further processing.

Figure 19:
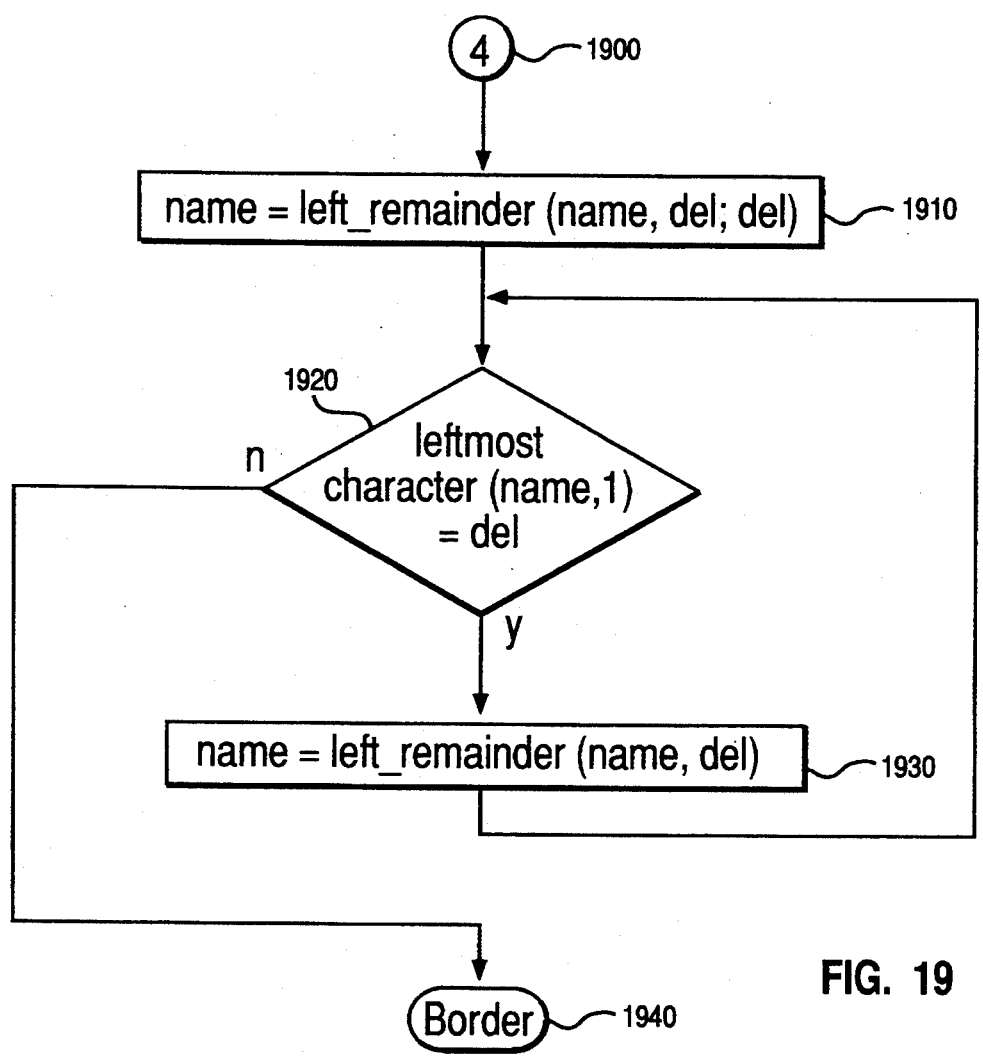
FIG. 19 is a flowchart depicting additional detailed logic of the extended name resolution for a single name space in accordance with the subject invention.

FIG. 19 is a flowchart depicting additional detailed logic of the extended name resolution for a single name space. It defines the extensions when <del><del> is formed. Processing commences at label 1900 when a branch is made via FIG. 17 label 1740. Function block 1910 strips of the two delimiters from a name. Then, at decision block 1920, a test is performed to determine if the leftmost character is still a delimiter. If so, then in function block 1930, another delimiter is stripped off and control is passed back to decision block 1920. If not, the control is passed to the border function at label 1940.

Figure 20:
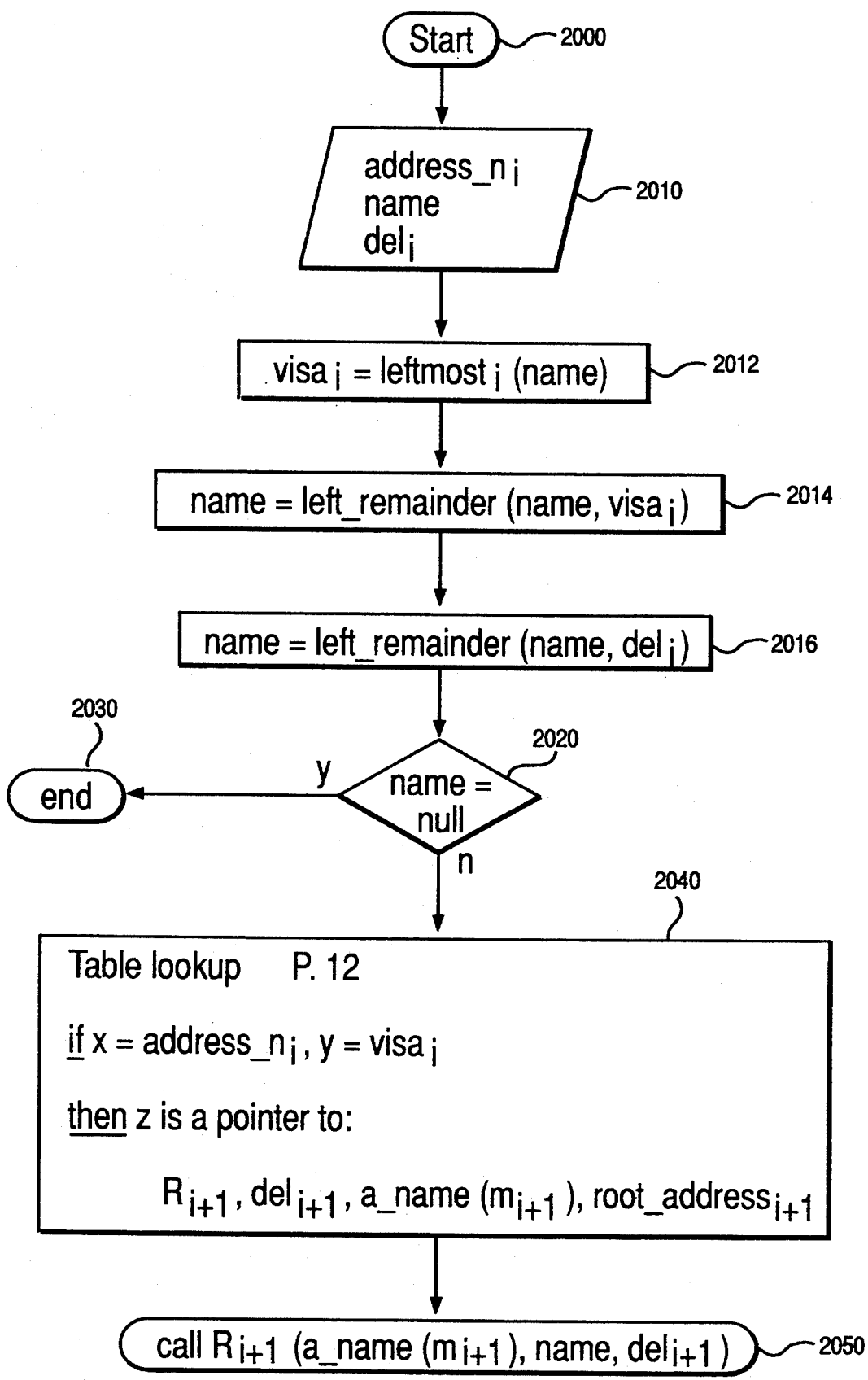
FIG. 20 is a flowchart representing the detailed logic of a border function in accordance with the subject invention.

FIG. 20 is a flowchart representing the detailed logic of a border function in accordance with the subject invention. Control is initially passed from FIG. 19 at label 1940 to label 2000 of FIG. 20. Then, at input block 2010, the address of the last node is received along with the name and delimiter character. Then, at function block 2012, the ith visa is formed based on the leftmost characters left of $del_i$ in name. Function block 2014 transforms name into a string variable without the visa characters. Then, at function block 2016, the delimiter is stripped off of the end of name and a test is performed at decision block 2020 to determine if name is equated to a null character. If so, then processing is completed as shown at terminal 2030. If not, then a table lookup is performed using the border table set forth in FIG. 21 to determine the resolved address for the following name space $S_{i+1}$ to be used in resolving the remainder of the name. Thus identifies the name resolution function $R_{i+1}$, the absolute address of the starting node $A\_M_{i+1}$, and the delimiter $del_{i+1}$. The counter i is incremented in function block 2050, and control is passed via label 2060 to function block 1700 in FIG. 17.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A computer system for resolving a cascaded name having concatenated a first name from a first naming system, at least a double first delimiter for designating the end of said first name, a visa, and at least a second name from a second naming system, into an address, said first naming system having a first resolution means and said double first delimiter, said second naming system having a second resolution means and a second delimiter, comprising:
    means for receiving said cascaded name;
    memory for storing at least one visa in a name border;
    a processor for scanning said cascaded name for said double first delimiter to parse said first name from said cascaded name;
    said processor for sending said first name to said first resolution means to obtain a first address of said first name, wherein said first address points to said name border;
    said processor for matching one of said visas in said name border with said visa in said cascaded name to generate a second address of said second naming system; and
    in response to generating said second address, said processor for sending said second name to said second resolution means of said second naming system to obtain a third address of said second name.

2. The computer system as recited in claim 1, wherein said second address identifies said second resolution means and said second delimiter.

3. The computer system as recited in claim 1, wherein said first naming system or said second naming system comprises the Unix ® file system, the domain name server dns, the Profile naming system, DOS, OS/2 ®, the Universal Directory Service UDS, or the Global directory server.

4. The computer system as recited in claim 1, wherein said first resolution means comprises:
    a look-up table containing a plurality of data structures; and
    each of said data structures containing two elements, said first element being said first name concatenated with a pass through, said second element being a pointer to another look-up table for said second naming system.

5. The computer system as recited in claim 1, wherein said first delimiter is identical to said second delimiter.

6. A computer system for constructing a cascaded name from at least a first name of a first naming system and at least a second name of a second naming system, said first naming system having a first delimiter and said second naming system having a second delimiter, comprising:
    memory for storing a name border;
    a display for displaying said cascaded name;
    a processor for concatenating a pass through to said first name to identify the end of said first name, said pass through comprising at least two of said first delimiters adjacently positioned;
    said processor for concatenating a visa, representing said second naming system, to said pass through, said visa being stored in said name border to enable crossing from said first naming system to said second naming system during resolution of said cascaded name;
    said processor for concatenating an identifier to said visa to identify the end of said visa; and
    said processor for concatenating said second name to said identifier.

7. The apparatus as recited in claim 6, wherein said name border is stored in a file system.

8. The computer system as recited in claim 6, wherein said first naming system or said second naming system comprises the Unix ® file system, the domain name server dns, the Profile naming system, DOS, OS/2 ®, the Universal Directory Service UDS, or the Global directory server.

9. The computer system as recited in claim 6, wherein said identifier comprises said first delimiter.

10. The computer system as recited in claim 6, wherein said first delimiter is identical to said second delimiter.

11. A computer-implemented method for constructing at least one cascaded name from at least a first name of a first naming system and a second name of a second naming system, said first naming system having a first delimiter and said second naming system having a second delimiter comprising the steps of:

(a) storing a name border is memory;

(b) concatenating a pass through to said first name to identify the end of said first name, said pass through comprising at least two of said first delimiters adjacently positioned;

(c) concatenating a visa, representing said second naming system, to said pass through;

(d) storing said visa in said name border to enable crossing from said first naming system to said second naming system during resolution of said cascaded name;

(e) concatenating an identifier to said visa to identify the end of said visa;

(f) concatenating said second name to said identifier; and (g) repeating said steps (b) through (f) until all names have been concatenated.

12. The method as recited in claim 11, wherein said name border is stored in a file system.

13. The method as recited in claim 11, wherein said first naming system or said second naming system comprises the Unix ® file system, the domain name server dns, the Profile naming system, DOS, OS/2 ®, the Universal Directory Service UDS, or the Global directory server.

14. The method as recited in claim 11, wherein said identifier comprises said first delimiter.

15. A computer-implemented method for resolving a cascaded name having concatenated a first name from a first naming system, at least a double first delimiter, a visa, and a second name from an existing second naming system, into an address, said first naming system comprising a first resolution means and said double first delimiter, said second naming system comprising a second resolution means and a second delimiter, comprising the steps of:

(a) storing at least one visa in a name border;

(b) scanning said cascaded name for said double first delimiter to parse said first name from said cascaded name;

(c) sending said first name to said first resolution means to obtain a first address of said first name, wherein said first address points to said name border;

(d) matching one of said visas in said name border with said visa in said cascaded name to generate a second address of said second naming system;

(e) in response to generating said second address, sending said second name to said second resolution means to obtain a third address of said second name; and (f) repeating steps (b) through (e) until no more double delimiters are detected.

16. The method as recited in claim 15, wherein said second address identifies said second resolution means and said second delimiter.

17. The method as recited in claim 15, wherein said first naming system or said second naming system comprises the Unix ® file system, the domain name server dns, the Profile naming system, DOS, OS/2 ®, the Universal Directory Service UDS, or the Global directory server.

18. The method as recited in claim 15, wherein said first resolution means comprises:

a look-up table containing a plurality of data structures; and each of said data structures containing two elements, said first element being said first name concatenated with a pass through, said second element being a pointer to another look-up table for said second naming system.

* * * * *